(12) United States Patent
Kapur et al.

(10) Patent No.: US 7,051,023 B2
(45) Date of Patent: May 23, 2006

(54) SYSTEMS AND METHODS FOR GENERATING CONCEPT UNITS FROM SEARCH QUERIES

(75) Inventors: Shyam Kapur, Sunnyvale, CA (US); Deepa Joshi, Santa Clara, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 10/713,576

(22) Filed: Nov. 12, 2003

(65) Prior Publication Data

US 2004/0199498 A1    Oct. 7, 2004

Related U.S. Application Data

(60) Provisional application No. 60/460,222, filed on Apr. 4, 2003.

(51) Int. Cl.
*G06F 17/30* (2006.01)

(52) U.S. Cl. .................. 707/5; 707/4; 707/6; 707/102; 704/9

(58) Field of Classification Search ................. 707/1–6, 707/10, 102; 704/4–9
See application file for complete search history.

(56) References Cited

U.S. PATENT DOCUMENTS

| | | | |
|---|---|---|---|
| 5,583,763 A | 12/1996 | Atcheson et al. | |
| 6,006,221 A * | 12/1999 | Liddy et al. | 707/5 |
| 6,076,088 A * | 6/2000 | Paik et al. | 707/5 |
| 6,363,373 B1 * | 3/2002 | Steinkraus | 707/3 |
| 6,539,348 B1 * | 3/2003 | Bond et al. | 704/9 |
| 6,584,464 B1 | 6/2003 | Warthen | |
| 6,675,159 B1 * | 1/2004 | Lin et al. | 707/3 |
| 6,772,150 B1 * | 8/2004 | Whitman et al. | 707/6 |
| 2003/0069880 A1 * | 4/2003 | Harrison et al. | |

* cited by examiner

*Primary Examiner*—Debbie M. Le
(74) *Attorney, Agent, or Firm*—Brown Raysman (57) ABSTRACT

Systems and method for enhancing search functionality provided to a user. In certain aspects, a query processing engine automatically decomposes queries into constituent units that are related to concepts in which a user may be interested. The query processing engine decomposes queries into one or more constituent units per query using statistical methods. In certain aspects, no real world knowledge is used in determining units. In other aspects, aspects of world and content knowledge are introduced to enhance and optimize performance, for example, manually using a team of one or more information engineers.

34 Claims, 9 Drawing Sheets

| Extensions 1-6 ( 20 ) that contain the string birds ( link ) ( Select ) in list, map (list): , ( ) : ||||||
|---|---|---|---|---|---|---|
| Rank | ( Extension ) | Results | Action | ( Frequency as an extension ) ... | ... and as a query | In list, map (list) |
| 1 | birds ( 19 ) | ( link ) | ( Select ) | 32991 | 5471 | , ( ) |
| 2 | birds of prey | ( link ) | ( Select ) | 2616 | 1529 | , ( ) |
| 3 | humming birds | ( link ) | ( Select ) | 301 | 201 | , ( ) |
| 4 | endangered birds | ( link ) | ( Select ) | 268 | 147 | , ( ) |
| 5 | birds of pray | ( link ) | ( Select ) | 149 | 78 | , ( ) |
| 6 | types of birds | ( link ) | ( Select ) | 136 | 93 | , ( ) |

| Associations 1-6 ( 465 ) that contain the string birds ( link ) ( Select ) in list, map (list): , ( ) : ||||||
|---|---|---|---|---|---|---|
| Rank | ( Association ) | Results | Action | ( Frequency as an association ) ... | ... and as a query | In list, map (list) |
| 1 | pictures of ... ( 8040 ) | ( link ) | ( Select ) | 1519 | 536 | , pictures ( synonyms ) |
| 2 | love ... ( 3982 ) | ( link ) | ( Select ) | 897 | 320 | , ( ) |
| 3 | wild ... ( 1050 ) | ( link ) | ( Select ) | 748 | 148 | , ( ) |
| 4 | ... for sale ( 5226 ) | ( link ) | ( Select ) | 686 | 148 | , ( ) |
| 5 | exotic ... ( 365 ) | ( link ) | ( Select ) | 680 | 203 | adult words, ( ) |
| 6 | ... pictures ( 15109 ) | ( link ) | ( Select ) | 658 | 92 | , ( ) |

FIG. 7

Query: wood     Submit [R][T] Both    ( --> 12 ) First line: 1     Adult filter is on

| Extensions 1-6 ( 88 ) that contain the string *wood* 104875 ( *1409* ) ( Lists ) in list, map (list): , : |||||||
|---|---|---|---|---|---|---|
| Rank | ( Extension ) | Search | Action | ( Frequency ) | Related | In list, map (list) | In list, map (list) |
| 1 | ... | wood ( 87 ) | ( Lists ) | 104875 ( *1409* ) | wood 104875 ( *1409* ) ( Lists ) | , | , |
| 2 | elijah ... ( 10 ) | elijah wood ( 2 ) | ( Lists ) | 8196 ( *5561* ) | elijahwood 130 ( *114* ) ( Lists ) | , | , |
| 3 | ... flooring ( 17 ) | wood flooring ( 1 ) | ( Lists ) | 2017 ( *713* ) | woodflooring 52 ( *29* ) ( Lists ) | , | , |
| 4 | ... floor ( 41 ) | wood floor ( 1 ) | ( Lists ) | 1877 ( *164* ) | woodfloor < 32 ( *19* ) ( Lists ) | , | , |
| 5 | ... working ( 17 ) | wood working ( 4 ) | ( Lists ) | 1836 ( *585* ) | woodworking 9932 ( *1763* ) ( Lists ) | , | , |
| 6 | ... floors ( 10 ) | wood floors ( 2 ) | ( Lists ) | 1739 ( *450* ) | woodfloors < 32 ( *26* ) ( Lists ) | , | , |

| Associations 1-6 ( 2161 ) that contain the string *wood* 104875 ( *1409* ) ( Lists ) in list, map (list): , : |||||||
|---|---|---|---|---|---|---|
| Rank | ( Association ) | Search | Action | ( Frequency ) | Related | In list, map (list) | In list, map (list) |
| 1 | ... furniture ( 2438 ) | wood furniture | ( Lists ) | 3374 ( *299* ) | woodfurniture < 32 ( < *8* ) ( Lists ) | , forniture ( bad spellings ) funiture ( bad spellings ) furnature ( bad spellings ) furneture ( bad spellings ) furniature ( bad spellings ) furnitures ( bad spellings ) furntiure ( bad spellings ) | , |
| 2 | ... products ( 2720 ) | wood products | ( Lists ) | 2323 ( *112* ) | woodproducts < 32 ( *8* ) ( Lists ) | | , |
| 3 | ... burning ( 531 ) | wood burning | ( Lists ) | 2031 ( *66* ) | woodburning 391 ( *48* ) ( Lists ) | | , |
| 4 | ... county ( 4640 ) | wood county | ( Lists ) | 1931 ( *53* ) | woodcounty < 32 ( < *8* ) ( Lists ) | | , |
| 5 | robert ... ( 1615 ) | robert wood | ( Lists ) | 1685 ( *44* ) | robertwood < 32 ( < *8* ) ( Lists ) | | , |
| 6 | ... plans ( 1271 ) | wood plans | ( Lists ) | 1556 ( *112* ) | woodplans < 32 ( *15* ) ( Lists ) | | , |

FIG. 8

YAHOO! search

Your Search: wood                                [Search]    Advanced Web Search
                                                             Preferences Related: elijah wood, wood flooring, wood stoves, wood furniture
More...

Web   Directory   News   Yellow Pages   Images NEW!         What's New | Send Feedback

Categories: • Flooring > Wood  • B2B > Construction > Wood and Plastics  • Construction > Wood and Plastics > Lumber  • More...

SPONSOR RESULTS   (What's this?) (Become a Sponsor)

•15 Yr Pre-Finished 3/4" Oak $3.67/SF - Internet Floors - large dealer of hardwood and laminate flooring. Hard to surpass us in terms of price, selection or service. No sales tax, plus free shipping to most states. Contact us.
www.internetfloors.com

•Browse Hardwood Inventory - Carpet-USA is one of North America's leading distributors of carpeting and hardwood flooring. If we don't meet or beat the competition, you get your flooring free.
www.carpet-usa.com

TOP 20 WEB RESULTS out of about 16,600,000

1. Woodworking information and plans for woodworkers: WOOD Online
Woodworking information, plans, tools, software, and supplies are what you will find at your woodworking resource, Wood Online. ...
www.woodmagazine.com/ cached | more results from this site

2. WOODWEB
information resource for the woodworking industry
www.woodweb.com/ cached | more results from this site
↳ More sites about: Crafts > Woodworking

3. Robert Wood Johnson Foundation
RWJF makes grants to improve the health and health care of all Americans. The site contains information on applying for a grant, national programs, a full library of RWJF publications and much more.
www.rwjf.org/ cached | more results from this site
↳ More sites about: Health Care > Organizations

4. APA - The Engineered Wood Association
www.apawood.org/ cached | more results from this site
↳ More sites about: Lumber > Organizations

5. Audrey Wood Clubhouse
join Audrey and four other authors and illustrators in a clubhouse where kids, parents, teachers and librarians can join in activities and discover how children's picture books are written and illustrated.
www.audreywood.com/ cached | more results from this site

YAHOO! search

Search Home | Yahoo! | Help

Your Search: [birds]   [Search]   Advanced Web Search Preferences

Related: pictures of birds, birds of prey, love birds, wild birds  More...

Web  Directory  News  Yellow Pages  Images NEW!

What's New | Send Feedback

INSIDE YAHOO!

Animals: get Birds facts and photos on Yahooligans! Animals
Pictures: find Pictures of Birds on Yahoo! Picture Gallery
Pets: Information about Birds in Yahoo! Pets
· Classifieds: Search for *Birds*

Categories: * Animals and Pets > Birds  * Shopping > Animals > Birds  * Birds > Individual Birds  * More...

SPONSOR RESULTS   (What's this?) (Become a Sponsor)

*Birdhouses, Feeders, Seed and More - Lowes.com is committed to providing everything to make your outdoor living area a success. Information, buying guides, tools, fencing, wildlife supplies, patio furnishings and much more.
www.lowes.com

*Bird Control Products that Work - Bird control products and services that are effective, humane and easy to use. Free bird and wildlife control catalog.
www.nixalite.com

TOP 20 WEB RESULTS out of about 6,460,000

1. Cornell Lab of Ornithology
international center for the study, appreciation, and conservation of birds.
birds.cornell.edu/  cached  | more results from this site
↳ More sites about: New York State > Ithaca > Cornell University > Lab of Ornithology 2. Birds-Zoom School-Enchanted Learning Software
Birds at Zoom School is devoted to birds, bird evolution, fossils, songs, bird watching, backyard birding, bird jokes, bird stamps, bird origami, bird songs ...
www.enchantedlearning.com/subjects/birds/  cached  | more results from this site 3. BirdsnWays Guide to Pet Birds, Parrots & Exotic Birds Care & ...
Guide to pet parrots & exotic birds care and breeding. Classified ads ... chats, etc. Complete Guide to Pet Birds, Pet Parrots & Exotic Birds. ...
www.birdsnways.com/  cached  | more results from this site 4. Birds of North America
excerpts and subscription details for this series which provides a detailed scientific account of each of the more than 700 species nesting in the 50 United States and Canada.
www.birdsofna.org/  cached
↳ More sites about: Shopping > Bird Books > Titles

SYSTEMS AND METHODS FOR GENERATING CONCEPT UNITS FROM SEARCH QUERIES

CROSS REFERENCE TO RELATED APPLICATIONS

This application is a non-provisional of, and claims priority to, U.S. Provisional Application Ser. No. 60/460,222, filed Apr. 4, 2003, the contents of which are incorporated herein by reference in its entirety.

BACKGROUND OF THE INVENTION

The present invention relates generally to network and Internet search and interface systems and more particularly to search systems that provide enhanced search functionality.

With the advent of the Internet and the multitude of web pages and media content available to a user over the World Wide Web (web), there has become a need to provide users with streamlined approaches to filter and obtain desired information from the web. Search systems and processes have been developed to meet the needs of users to obtain desired information. Examples of such technologies can be accessed through Yahoo!, Google and other sites. Typically, a user inputs a query and a search process returns one or more links related to the query. The links returned may be very related, or they may be completely unrelated, to what the user was actually looking for. The "relatedness" of results to the query may be in part a function of the actual query entered as well as the robustness of the search system (underlying collection system) used.

Queries that users enter are typically made up of one or more words. For example, "hawaii" is a query, so is "new york city," and so is "new york city law enforcement." As such, queries as a whole are not integral to the human brain. In other words, human beings do not naturally think in terms of queries. They are an artificial construct imposed on us, in part, by the need to query search engines or look up library catalogs. Human beings do not naturally think in terms of just single words either. What human beings think in terms of are natural concepts. For example, "hawaii" and "new york city" are vastly different queries in terms of length as measured by number of words but they share one important characteristic: they are both made up of one concept each. The query "new york city law enforcement" is different, however, because it is made up of two distinct concepts "new york city" and "law enforcement." Human beings by nature build queries by entering one or more natural concepts, not simply a variably long sequence of single words.

Current search engine technologies including those at any of the major search providers, e.g., MSN, Google or any other major search engine site, do not understand queries the same way that human beings create them. This is perhaps the most important reason that prevents search providers from understanding user intent and providing optimal search results and content to querying users.

As can be seen there is a need for improved search and interface technology that provides results that are more in line with the actual concepts in which a user may be interested.

BRIEF SUMMARY OF THE INVENTION

The present invention provides systems and methods for enhancing search functionality provided to a user. In certain aspects, the present invention automatically decomposes queries into constituent units that are related to concepts in which a user may be interested.

According to the invention, a query processing engine decomposes queries into one or more constituent units per query using statistical methods. In one aspect, units are one or more word sequences that typically correspond to natural concepts. In certain aspects, no real world knowledge is used in determining units. In other aspects, aspects of world and content knowledge are introduced to enhance and optimize performance, for example, manually using a team of one or more information engineers. In other aspects, a query processing engine is provided to analyze and process one or more queries and query log files for certain time periods, e.g., a week, to automatically determine units and various unit extensions, unit associations, unit alternatives and other unit relationships. The units, extensions, associations and alternatives are stored to a repository or database and are used, in one aspect, to generate suggestions responsive to user queries. Such suggestions provide the user with the ability to further refine a search based on the concepts inherent in an original search query. Unit extensions, associations and alternatives are examples of the kinds of relationships among units that are automatically derived. Units, extensions, associations and alternatives are also particularly useful for performing contextual analysis and categorization of search queries as well as performing trend analysis of users' queries.

According to an aspect of the present invention, a computer-implemented method is provided for generating concept units from user search queries. The method typically includes receiving a plurality of queries, each query comprising a string of one or more words, tokenizing each query string to produce one or more tokens for each query, wherein the tokens for the queries form an initial set of units. The method also typically includes combining units from the initial set of units that appear adjacent each other in a query to form a second set of units, validating the second set of units, and repeating the steps of combining and validating one or more times using the second set of units in place of the initial set of units until a convergence condition is satisfied. A final set of units is formed once the convergence condition has been satisfied. The final set of units is stored to a memory.

According to another aspect of the present invention, a system for generating concept units from user search queries is provided. The system typically includes a memory unit and a processing module configured to receive one or more query log files, each query log file including a plurality of queries, each query including a string of one or more words. The processing module is also typically configured to tokenize each query from the query log files to produce an initial set of units, and thereafter, iteratively, until a convergence condition is satisfied: combine units from the initial set of units that appear adjacent each other in a query to form a second set of units, and validate the second set of units, wherein the second set of units is used for each iteration. Once the convergence condition has been satisfied, the processing module stores a final set of units to the memory unit.

According to yet another aspect of the present invention, a computer readable medium is provided that typically includes code for controlling a processor to generate concept units from a plurality of user search queries, each query comprising a string of one or more words. The code typically includes instructions to tokenize each query string to produce one or more tokens for each query, wherein the tokens for the queries form an initial set of units, combine units from the initial set of units that appear adjacent each other in a query to form a second set of units, and validate the second set of units. The code also typically includes instructions to repeat the tokenizing and combining instructions one or more times using the second set of units in place of the initial set of units until a convergence condition is satisfied, wherein a final set of units is formed once the convergence condition has been satisfied, and store the final set of units to a memory module.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE DRAWINGS

FIGS. 7–10 illustrate various displays of units and unit extensions, associations and alternatives according to various aspects of the present invention.

DETAILED DESCRIPTION OF THE INVENTION

Figure 1:
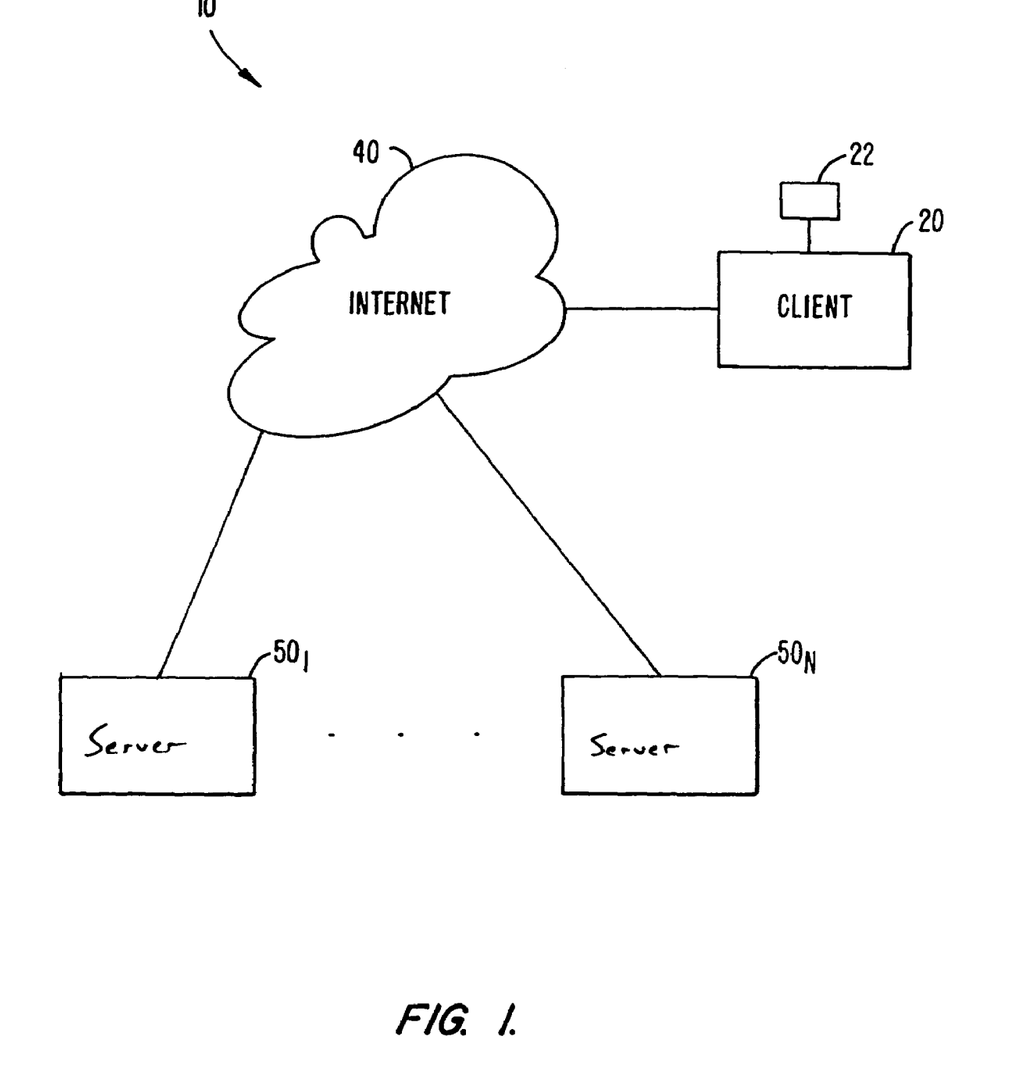
FIG. 1 illustrates a general overview of an information retrieval and communication system according to an embodiment of the present invention.

FIG. 1 illustrates a general overview of an information retrieval and communication network 10 including a client system 20 according to an embodiment of the present invention. In computer network 10, client system 20 is coupled through the Internet 40, or other communication network, e.g., over any LAN or WAN connection, to server systems $50_1$ to $50_N$. As will be described herein, client system 20 is configured according to the present invention to communicate with any of server systems $50_1$ to $50_N$, e.g., to access, receive, retrieve and display media content and other information such as web pages.

Several elements in the system shown in FIG. 1 include conventional, well-known elements that need not be explained in detail here. For example, client system 20 could include a desktop personal computer, workstation, laptop, PDA, cell phone, or any WAP-enabled device or any other computing device capable of interfacing directly or indirectly to the Internet. Client system 20 typically runs an HTTP client, e.g., a browsing program, such as Microsoft's Internet Explorer™ browser, Netscape Navigator™ browser, Mozilla™ browser, Opera browser, or a WAP-enabled browser in the case of a cell phone, PDA or other wireless device, or the like, allowing a user of client system 20 to access, process and view information and pages available to it from server systems $50_1$ to $50_N$ over Internet 40. Client system 20 also typically includes one or more user interface devices 22, such as a keyboard, a mouse, touchscreen, pen or the like, for interacting with a graphical user interface (GUI) provided by the browser on a display (e.g., monitor screen, LCD display, etc.), in conjunction with pages, forms and other information provided by server systems $50_1$ to $50_N$ or other servers. The present invention is suitable for use with the Internet, which refers to a specific global internetwork of networks. However, it should be understood that other networks can be used instead of or in addition to the Internet, such as an intranet, an extranet, a virtual private network (VPN), a non-TCP/IP based network, any LAN or WAN or the like.

According to one embodiment, client system 20 and all of its components are operator configurable using an application including computer code run using a central processing unit such as an Intel Pentium™ processor, AMD Athlon™ processor, or the like or multiple processors. Computer code for operating and configuring client system 20 to communicate, process and display data and media content as described herein is preferably downloaded and stored on a hard disk, but the entire program code, or portions thereof, may also be stored in any other volatile or non-volatile memory medium or device as is well known, such as a ROM or RAM, or provided on any media capable of storing program code, such as a compact disk (CD) medium, a digital versatile disk (DVD) medium, a floppy disk, and the like. Additionally, the entire program code, or portions thereof, may be transmitted and downloaded from a software source, e.g., from one of server systems $50_1$ to $50_N$ to client system 20 over the Internet as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in any programming language that can be executed on a client system such as, for example, in C, C+, HTML, XML, Java, JavaScript, any scripting language, such as VBScript. In some embodiments, no code is downloaded to client system 20, and needed code is executed by a server, or code already present at client system 20 is executed.

Figure 2:
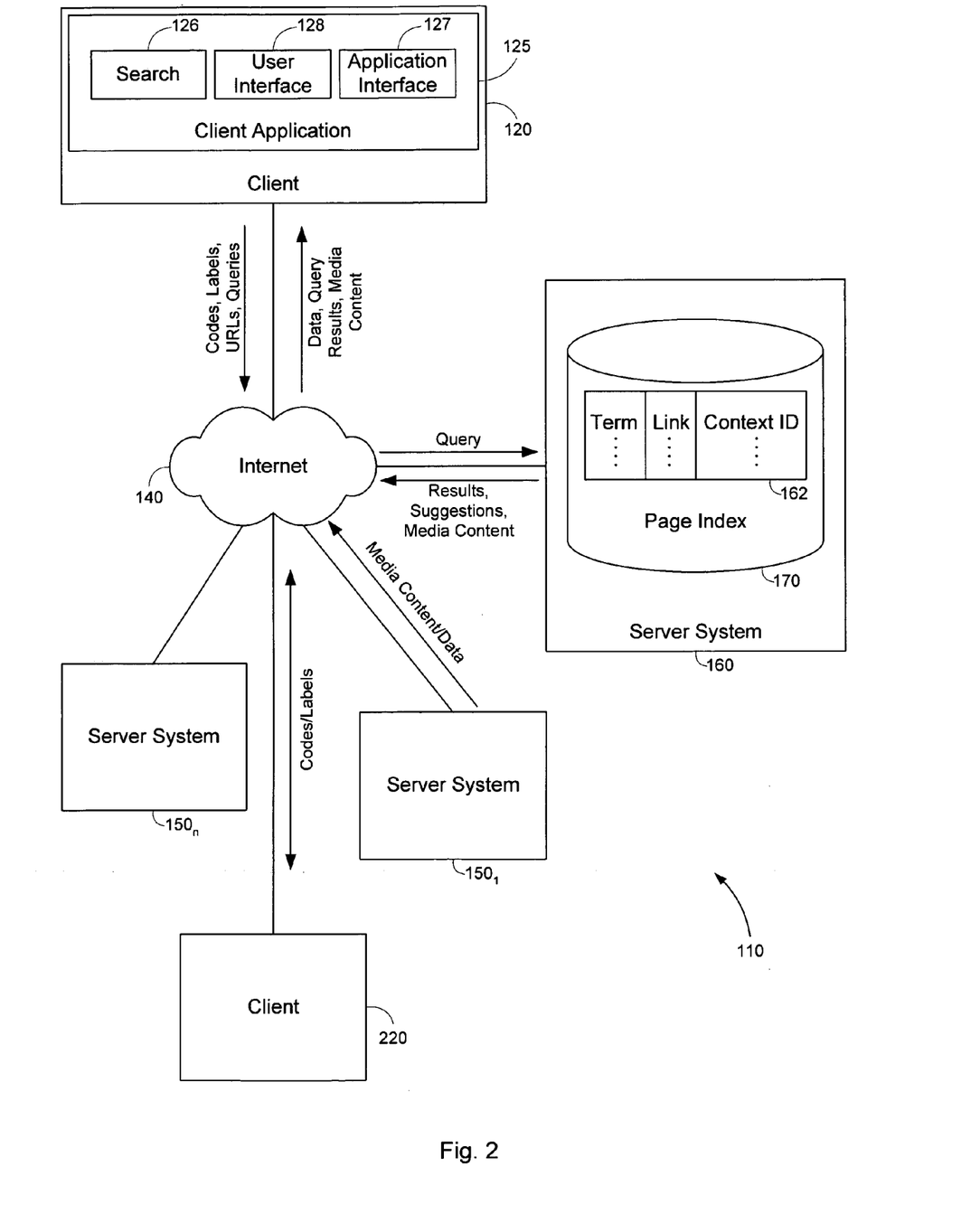
FIG. 2 illustrates an information retrieval and communication network for communicating media content according to an embodiment of the invention.

FIG. 2 illustrates another information retrieval and communication network 110 for communicating data and media content according to an embodiment of the invention. As shown, network 110 includes client system 120, server systems 150 and server system 160. In network 110, client system 120 is communicably coupled through Internet 140 or other communication network to server systems 150 and 160. As discussed above, client system 120 and its components are configured to communicate with server systems 150 and 160 and other server systems over the Internet 140 or other communication networks.

According to one embodiment, a client application (represented as module 125) executing on client system 120 includes instructions for controlling client system 120 and its components to communicate with server systems 150 and 160 and to process and display data content received therefrom as is described herein. Client application 125 is preferably transmitted and downloaded to client system 120 from a software source such as a remote server system (e.g., server systems 150, server system 160 or other remote server system), although client application module 125 can be provided on any software storage medium such as a floppy disk, CD, DVD, etc., as discussed above. For example, in one aspect, client application module 125 may be provided over the Internet 140 to client system 120 in an HTML wrapper including various controls such as, for example, embedded JavaScript or Active X controls, for manipulating data and rendering data in the various objects, frames and windows as will be described later.

Additionally, client application module 125 includes various software modules for processing data and media content. For example, application module 125 might include one or more of a search module 126 for processing search requests and search result data, a user interface module 127 for rendering data and media content in text and data frames and active windows, e.g., browser windows and dialog boxes, and an application interface module 128 for interfacing and communicating with various applications executing on client 120. Further, interface module 127 may include a browser, such as a default browser configured on client system 120 or a different browser. As one example, a client application module 125 according to one embodiment can be downloaded from Yahoo! Inc. using the URL: http://help.yahoo.com/help/us/sbc/browser/.

Referring to FIG. 2, according to one embodiment, server system 160 is configured to provide search result data and media content to client system 120, and each server system 150 is configured to provide data and media content such as web pages to client system 120, for example, in response to links selected in search result pages provided by server system 160. As will be described in more detail below, server system 160 in one embodiment references various collection technologies for collecting information from the World Wide Web and for populating one or more indexes with, for example, pages, links to pages, etc. Such collection technologies include automatic web crawlers, spiders, etc., as well as manual or semi-automatic classification algorithms and interfaces for classifying and ranking web pages within an hierarchical structure. In certain aspects, server 160 is also configured with search related algorithms for processing and ranking web pages, such as for example, the PageRank algorithm from Google. Server 160 is also preferably configured to record user query activity in the form of query log files.

Server system 160, in one aspect, is configured to provide data responsive to various search requests received from a client system, in particular search module 126. Server systems 150 and 160 may be part of a single organization, e.g., a distributed server system such as that provided to users by Yahoo! Inc., or they may be part of disparate organizations. Server systems 150 and server system 160 each includes at least one server and an associated database system, and may include multiple servers and associated database systems, and although shown as a single block, may be geographically distributed. For example, all servers of server system 160 may be located in close proximity to one another (e.g., in a server farm located in a single building or campus), or they may be distributed at locations remote from one another (e.g., one or more servers located in city A and one or more servers located in city B). As used herein, the term "server system" will typically include one or more logically and/or physically connected servers distributed locally or across one or more geographic locations. Additionally, the term "server" will typically include a computer system and an associated storage system and database application as is well known in the art. The terms "server" and "server system" will be used interchangeably herein.

According to one embodiment, server 160 is configured with one or more page indexes 170 and algorithms for providing search results to users in response to search queries received from client systems 120 and 220. In certain aspects, server system 160 is additionally configured to provide novel, enhanced search query analysis and categorization functionality in response to search requests from client system 120 as will be discussed in more detail herein. Such query analysis and categorization functionality and other features are discussed in U.S. patent application Ser. No. 60/510,220, filed on Oct. 9, 2003, titled "SEARCH SYSTEMS AND METHODS WITH CONCEPTUAL CLUSTERING", and U.S. patent application Ser. No. 10/12,307, filed on even date herewith, titled "SYSTEMS AND METHODS FOR SEARCH QUERY PROCESSING USING TREND ANALYSIS,", the contents of which are incorporated by reference herein.

In one embodiment, for example, processes executing on server 160 perform contextual categorization analysis of search queries and/or search results and respond with search results grouped in contexts. Many search terms may have different meanings depending on the context intended. For example, if a user performs a search using the term "Java," the intended context is not clear. The user may be interested in the Java computer language, in the Indonesian Island, Java, or in coffee which is often colloquially referred to as java. Thus different words may have different word senses and contexts. In one aspect, the present invention advantageously analyzes search queries and/or results and groups results in contexts for display at the user's computer 120. For example, in the above example for the search term "Java," server 160 returns search results grouped into three (or more if other contexts are identified) contexts or word senses: Java for the computer language, Java the island and coffee java. The system may be configured to display the results in sets with links provided in association with each context, or the system may display just the contexts (with enough information to distinguish the contexts to the user) without any links and allow the user to select the desired context to display the associated links. In the Yahoo! network system, for example, a set of contexts might be displayed with each context having a set of links to pages from the search index, links associated with sponsored matches, links associated with directory matches and links associated with Inside Yahoo! (IY) matches.

In addition to words or phrases having ambiguous meanings, such as "Java," the system of the present invention is configured in one embodiment to group results into contexts for search terms that are not necessarily ambiguous. One example is the results returned for the search term "Hawaii." The term "Hawaii" in and of itself might not be ambiguous, however, the character of the results returned for such a term could be very broad, related to literally everything discussing or mentioning "Hawaii." To provide more useful results to the user, the system of the present invention preferably organizes search results into contexts by leveraging the knowledge of what the results are actually related to. For example, for Hawaii, the system may return results in various context groupings such as "Hawaii: travel," "Hawaii: climate," "Hawaii: geography," "Hawaii: culture," etc. For example, in certain aspects, context identifiers are stored in association with page links in the index, so that when a search is performed links can be grouped according to the identifiers (see index table 162 of FIG. 2). In the above example, the terms "travel," "climate," "geography" and "culture" represent context identifiers. A page link may be associated with multiple context identifiers and might therefore be displayed in association with multiple identifiers. Such identifiers are preferably automatically associated with links by the system as users perform related searches, however, the identifiers may also be modified and associated with links manually by a team of one or more administrators. In this manner, knowledge gleaned from numerous searches is fed back into the system to define and re-define contexts to make the displayed search results more valuable and useful to the requesting users.

In one embodiment, processes on server 160 perform concept discovery or concept analysis of search terms to provide more meaningful results to the user. For example, for the search phrase "New York City" it is fairly clear that the user is interested in sites related to New York City (the city or region) as opposed to a city in New York (state). Similarly, for "New York City law enforcement" it is clear that the user is interested in sites related to law enforcement (e.g., segment of jobs) in New York City. However, most conventional search engines would simply search using the individual terms "New," "York," "City," "law" and "enforcement" regardless of the order of the terms as used in the search phrase. The present invention advantageously analyzes terms in the search phrase to identify one or more concepts that make up the search query. In preferred aspects, the system uses the order that search terms are presented to identify concepts and categorize search results. For example, using "New York City law enforcement" as the search phrase, the system identifies, e.g., by hashing, "New York City" and "law enforcement" as two concepts in the search phrase and returns results for the two concepts. The same results would be returned for "law enforcement in New York City." However, for "city law enforcement in New York," different results would be returned based on the concepts "law enforcement" and "New York" and "city," or "city law enforcement" and "New York." Likewise, "enforcement of law in New York City" would be identified as including the concepts "New York City," "law" and "enforcement." Thus, the order of concepts is not so important as the order of terms that make up a concept. In preferred aspects, concepts are included in the page index or a separate concept index may be implemented. It should be noted that "law enforcement" could be regarded as the same as "enforcement of law" or not depending on the context.

Unit Extraction and Processing

According to one embodiment of the present invention, a query processing engine is provided to process queries and decompose queries into constituent units. Although queries are the preferred content source from which units are generated, and for which the remainder of this description will focus, it is understood that units can also be generated from other sources of content, including anchor texts, documents, e-mail messages, web pages, web sites, online product catalogues, etc. Units typically correspond well with natural concepts and are particularly useful for performing context and categorization analysis of queries, concept discovery, trend analysis and other query analysis processes. Units are sequences of one or more words that appear in user queries. Each word (and therefore also a unit) might include an acronym or any other sequence of one or more alphanumeric and other characters as are possible to provide from a keyboard or other user interface device. In general, a query is a set of one or more units, i.e., a query can be decomposed into a set of one or more units. The order of words in a unit is important, however, the order of units in a query is typically not important.

The query processing engine of the present invention allows for a query processing system to implement concept discovery and analysis processes and context analysis, query categorization and disambiguation processes as mentioned above as well as many other processes that might enhance the quality of results returned to a user in response to a search query. A query processing engine according to the present invention may be implemented in a stand alone device or system connected to a network, e.g., a computer system executing various query processing and analysis algorithms and processes as discussed herein, or it may be included as part of a search server system such as server system 160, or other server system.

Figure 3:
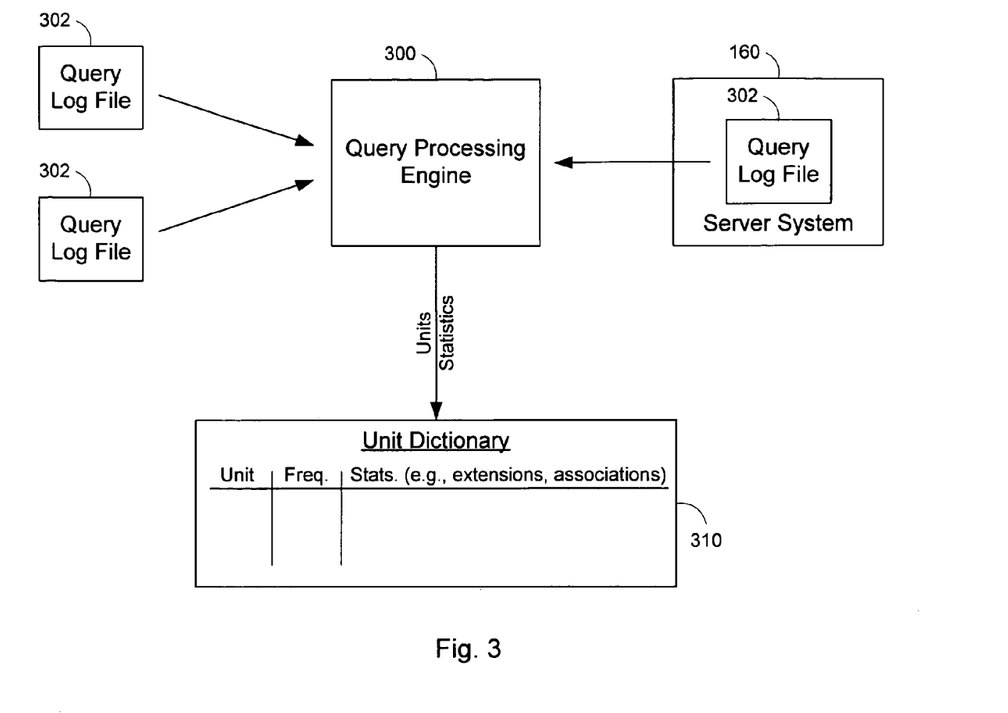
FIG. 3 illustrates a system including a query processing engine configured to process query log files to populate a unit dictionary according to an embodiment of the present invention.

FIG. 3 illustrates a system including a query processing engine 300 according to an embodiment of the present invention. As shown, engine 300 receives one or more query log files 302 (and, in some aspects, individual queries in real time) from various sources over the Internet or through various network connections, e.g., LAN, WAN, direct links, distribution media (e.g., CD, DVD, floppy disk), etc. Examples of network sources include search server 160 (FIG. 1), or multiple search servers 160 in a distributed network of search servers, and one or more of servers 150. Query log file sources are typically associated with the same organization or entity, e.g., Yahoo! servers, but need not be. The query log files (query logs) are processed by query engine 300 to extract units using statistical methods such as may be used in information theory or concepts such as mutual information. In preferred aspects, daily query logs are used, although logs for different time periods, e.g., hours, weeks, etc. may be used as desired. Query logs typically include actual queries submitted by users, and in some cases additional useful meta-information such as geographic location of querying users, timestamps, IP addresses of client systems, cookies, type of client (e.g., browser type), etc. An example of an input query log file would be a list of queries of the form <query string, meta-information>, or <count, query string> where count refers to the number of occurrences (frequency) of the particular query string. Query processing engine 300 processes the various query logs (and queries) and generates units and associated statistics therefrom. The units and associated statistics, such as frequency of occurrence, rank, etc., are stored to a memory or database file 310.

Figure 5:
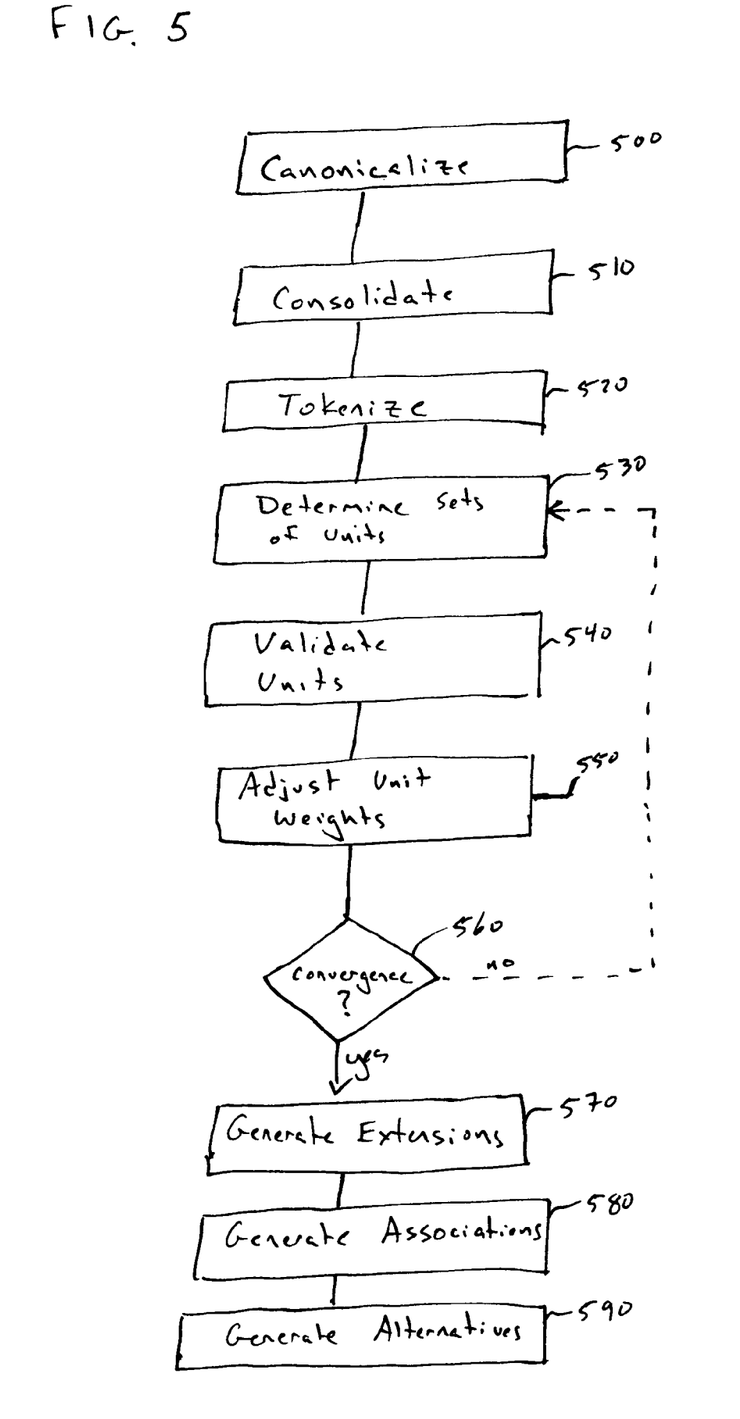
FIG. 5 illustrates an example of a methodology for processing queries and query logs to generate units according to one embodiment.

An example of a methodology for processing queries and query logs to generate units according to one embodiment is shown in FIG. 5. In step 500, the query log files are canonicalized to remove duplicates and odd symbols. For example, a canonicalization algorithm or process is applied that reduces words to base meanings—e.g., remove suffixes, plural designations, prefixes, etc. In step 510, a single consolidated query file is created. For example, for multiple query log files, the files are merged into a single consolidated query file for a specific period of time. For example, multiple occurrences of the same query are included as a single query, with a count equal to the total number of occurrences of the query from the merged files. In preferred aspects, a week period is preferred for the specific period of time for the consolidated file. A week's worth of queries captures different patterns in queries that are observed during the work week (different on different days) and the weekend. It will be appreciated, however, that a different period of time may be used. In step 520, the consolidated query file is read in and each query entry is tokenized. For example, each line in the consolidated log file may include a query and associated information of the form <query string, meta-information>. In this example, each query string in each line of the query log file is tokenized to produce a set of tokens. Each distinct token and the number of occurrences of each token in the entire file is stored. These tokens are considered by the process to be an initial set of units at this point.

In step 530, the consolidated query file is scanned and each query is broken into a set of one or more units based on the current set of units. For example, a query may itself be a single unit, or it may include several units. Possible new units are then determined, for example, by combining units that appear adjacent each other in each particular query. These possible new units are stored as well. In step 540, the possible new units are validated. For example, in one embodiment, the consolidated query file is again scanned and this time the possible units from step 530 are analyzed to determine which are actually units (e.g., based on mutual information and other metrics). For example, determination of which possible units should be units is based, in one aspect, on detecting how often the constituent units appear by themselves separate from each other and comparing this number to how often they appear next to each other across an entire set of queries. For example, "new york" is detected as a unit because, even though "new" appears in several different contexts, in several contexts that "york" appears in, "new" also appears. In step 550, the weights of units are adjusted, e.g., the weights of units that have been absorbed into other units are adjusted and the weights are given back to units that are parts of a unit no longer considered to be a unit. For example, when a possible unit is determined to be a unit, then the aggregate weight/frequency of the queries in which the new unit appears is subtracted from the weight of the constituent units and added to the weight of the new unit.

In step 560, a decision is made as to whether sufficient convergence of the units has occurred. In one aspect, convergence is defined to be the point beyond which the change in units generated/deleted is smaller than some pre-defined threshold value. For example, if a run of the algorithm has generated a million units, then the stage after which there are only a hundred units generated/deleted could be considered to be the point at which convergence is close or satisfied. In one aspect, even after satisfaction of, or closeness to, convergence is detected, some adjustments may be made to ensure that the units generated meet some essential criteria of goodness. If convergence has not been achieved, steps 530 to 560 are repeated. If convergence has been achieved, a final set of units is determined and stored, and processing proceeds to steps 570 to 590, which may be performed in any order.

In step 570, for the final set of units, extensions for each unit are generated. For example, in one aspect, extensions are generated by scanning through the final set and identifying word string overlaps. An extension of a unit is a larger unit that contains all the words in the first unit. For example, "new york city" could be an extension of "new york". According to one aspect, extension generation is implemented by performing a full text search on a units table in a database, e.g., MySQL database, to find if a particular unit appears within any other unit. In one aspect, a complete scan of a full text index for each unit is performed. However, this may be quite a slow process depending on available resources. Therefore, in another aspect, all units are loaded in a hash table in memory from a units file. Then one unit at a time is read from the units file. The unit is broken up into words and sequences of these words are constructed. For example, consider a unit u1 with frequency f. Unit u1 is made up of three words w1, w2 and w3. The order of these words in u1 is "w1 w2 w3". The following sequences from the words are created: w1, w2, w3, w1 w2, w2 w3, and w1 w2 w3. While creating sequences the order of words in the unit is not changed. Then for each sequence, a lookup in the hash table of units is performed. If the sequence happens to be a unit, u1 is output as an extension of the sequence. In this case if w3 and "w1 w2" are units, then the following records are output in one aspect:

ful w3; and ful "w1 w2".

Since a complete scan of a full text index is replaced by a few hash lookups, the method in this aspect may be more efficient.

In step 580, for the final set of units, associations for each unit are generated. For example, in one aspect, associations are generated based on which units associate frequently with other units in queries. An association of a unit is another unit with which the first unit appears in queries. For example, "seattle hotels" could be an association of both the unit "seattle" and the unit "hotels". In one aspect, the query_units file in which each query is broken up into units is used to compute associations. This file, in one aspect, includes three columns—query frequency, query and list of units appearing in the query. All units that appear in the same query contribute to associations. Consider a query q in the query_units file with frequency f and containing units u1,u2,u3. For this query the following records are output in one aspect:

u1 u2 f;

u2 u3 f; and u1 u3 f.

Then this output is sorted, and the frequency contributed to each pair by all possible queries is added. In one aspect, all associations that are below a threshold are thrown away at this stage.

In step 590, for the final set of units, alternatives for each unit are generated. For example, in one aspect, alternatives are generated based on both string distance and relative frequency considerations. An alternative form of a unit (or, any sequence of words) is a preferred, corrected, or even just related form of the original expression. For example, "britney spears" is the correct form of the name of the popular singer for tens of alternative spellings that are quite commonly found in query logs. Another example is that the unit "belgium" is an alternative form of the less popular unit "belgian". The associations, extensions and alternatives are preferably stored to a separate "suggestions" file, but they may be stored to file 310. In one aspect, alternatives are generated by leveraging the notion of edit distance between strings. For example, two strings are said to be apart by edit distance d if d steps of type events, e.g., insertions, deletions, replacements, etc., are required to transform one string to the other. Two units that are apart by an edit distance less than a threshold value, e.g., a small number such as 1 or 2, are considered to be candidate alternative forms. Whether they are true alternative forms or not is determined, in one aspect, by comparing their relative frequencies and the frequencies of other units that are also close in terms of edit distance. The frequency information helps determine which of the similar strings is most likely to be the correct form. For example, "britney spears" might be misspelled in a many many different ways in the queries. In one aspect, the correct form is identified by comparing the frequency of the variant forms and selecting the highest frequency form as the best candidate for the being the correct form.

Figure 4:
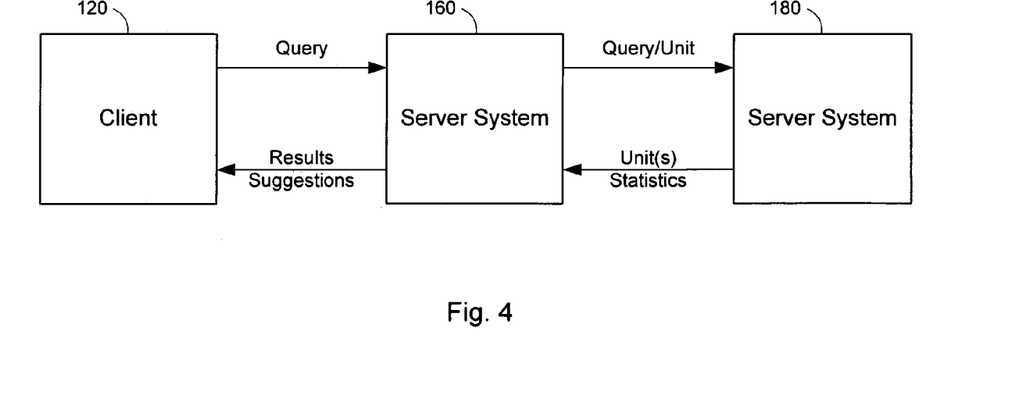
FIG. 4 illustrates a system including a unit dictionary and associated processing intelligence, including a query processing engine in some aspects, according to an embodiment of the present invention.

In certain aspects, query processing engine 300 may be implemented in server system 160. For example, software for implementing query processing, unit decomposition, unit dictionary population and statistical analysis might execute on server system 160 in addition to search response processes that interface with users and page index 170. In other aspects, query processing engine 300, or portions of query processing engine 300, might execute in a separate system such as shown in FIG. 4. For example, in one aspect, in response to a query from a user system 120, server system 160 might communicate the query to server system 180 requesting that units and statistics be returned or that suggestions be returned. Server 160 processes units and any statistics received from system 180 and returns results responsive to the user's query to the user along with suggestions and other information. Suggestions might be generated by server 160 using the returned units and statistics or suggestions might be generated by system 180. In certain aspects, suggestions are a way to involve users in a continuous dialogue with the search system. Suggestions are hints and tips about what the user might want to explore next based on highly sophisticated understanding of user needs as captured in units and their extensions, associations and alternatives.

In one aspect, a unit dictionary 310 is advantageously used to generate suggestions to present to the user in addition to, or in lieu of, actual search results. For example, search server 160 or other search intelligence module may send a query to a specialized server, e.g., server 180 of FIG. 4, controlling the unit dictionary, or an instance of the unit dictionary may be stored to search server 160. In one embodiment, a single user query is processed to determine suggestions using the associations and extensions for the unit(s) of the single query, which are then merged into a single file, e.g., a "query suggestion" file. Some additional filtering might be done so that very similar suggestions are not repeated. For example, only the more popular of, say, the three suggestions "spain maps", "spain map" and "map of spain" would be included or shown.

Figure 6:
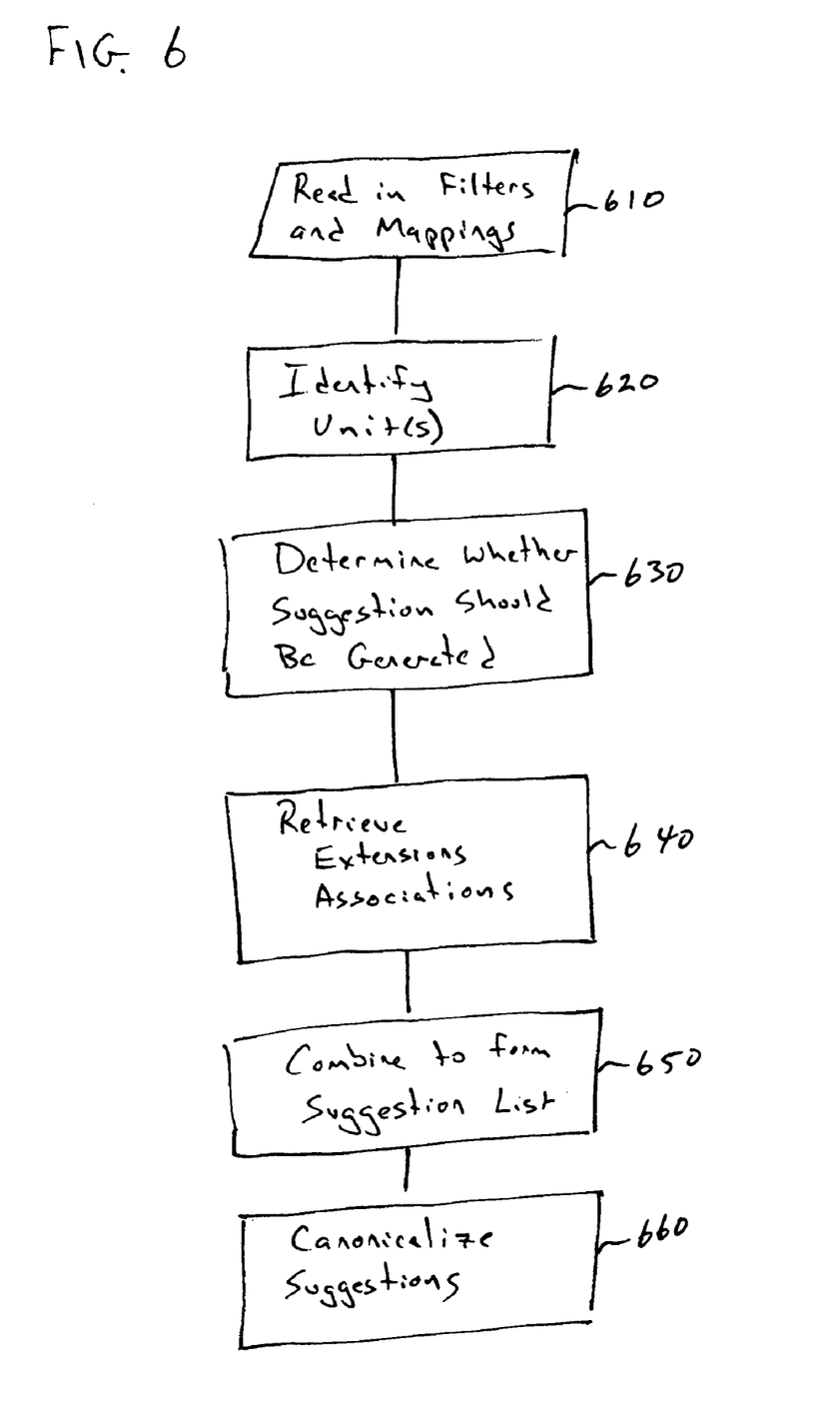
FIG. 6 illustrates an example of a methodology for generating suggestions according to one embodiment.

An example of a methodology for generating suggestions according to one embodiment, using extensions, associations and alternatives in dictionary 310 (e.g., as determined by the methodology for generating units as shown in FIG. 5), is shown in FIG. 6. In step 610, filtering and mapping data is read into the system. Such filtering and mapping data, e.g., in the form of lists, may be provided manually, or automatically. Such data may be provided to the system in a periodic, continuous manner over time or it may be provided in a single file or set of files. Such data is preferably used to canonicalize and filter suggestions, and includes, for example, word lists (adult word list, stopwords list, etc.) as well as mappings (synonyms, preferred form-variants etc.). In step 620, one or more units are identified. For example, a unit may be selected by the search server 160, or by system 180, in response to a single user query by tokenizing the query and performing a look-up in the unit dictionary using the resulting token(s). In step 630, the identified units are processed to determine whether suggestions should be generated for each unit. The suggestion generation process then processes each identified unit to determine whether any associations and extensions are present in the suggestion file for the unit. In step 640, extensions and associations for the unit are retrieved. Those extensions and associations that are not appropriate for some reason are filtered out. For example, if the unit is one word long, a suggestion that contains three extra content words is probably not appropriate and is therefore preferably not selected. In one aspect, suggestions are generated for units if there are associations and/or extensions for them. Under certain circumstances, suggestions might not be generated for a particular unit even if there are associations or extensions for the unit. For example, in one aspect, suggestions are not generated for units that are illegal concepts. Likewise, suggestions might not be generated for units that are known spelling errors, or are too short, and so on. Not all extensions or associations are considered suitable to be suggestions. In one aspect, it is determined whether the generated suggestion appears as a query. If no exact match is found, a query that contains the suggestion is searched for. Even such a query is not considered suitable to be a suggestion unless the part that is added to the original unit is itself another unit. Suggestions can also be generated for multi-unit queries using similar techniques.

In step 650, the retrieved extensions and associations are combined to form an initial set of suggestions. In step 660, the initial set of suggestions is canonicalized in order to remove similar suggestions, preferably making sure that the weight of a suggestion removed is added to the weight of the suggestion(s) retained. Canonicalization includes taking care of singular and plural forms, common synonyms, typos, etc. Suggestions not suitable for any reason are also removed. Steps 630 through 660 are preferably repeated for each of the units in a set of units. In one aspect, using the suggestions generated, links from the page index 170 (FIG. 2) are retrieved and displayed to a user.

It will be appreciated that not all steps shown in FIG. 5 and FIG. 6 are necessary and that alternative and/or additional steps may be included. In certain aspects, such query and query log file processing as discussed herein is implemented in Perl.

FIGS. 7–10 illustrate displays of units and unit extensions, associations and alternatives for a particular input query according to aspects of the present invention. Such displays are provided to a user using a display device such as a monitor or printer and are useful to allow a user, such as a system administrator or end user, to identify and analyze various units, associations, extensions and alternatives generated from queries or other content sources.

Figure 7:
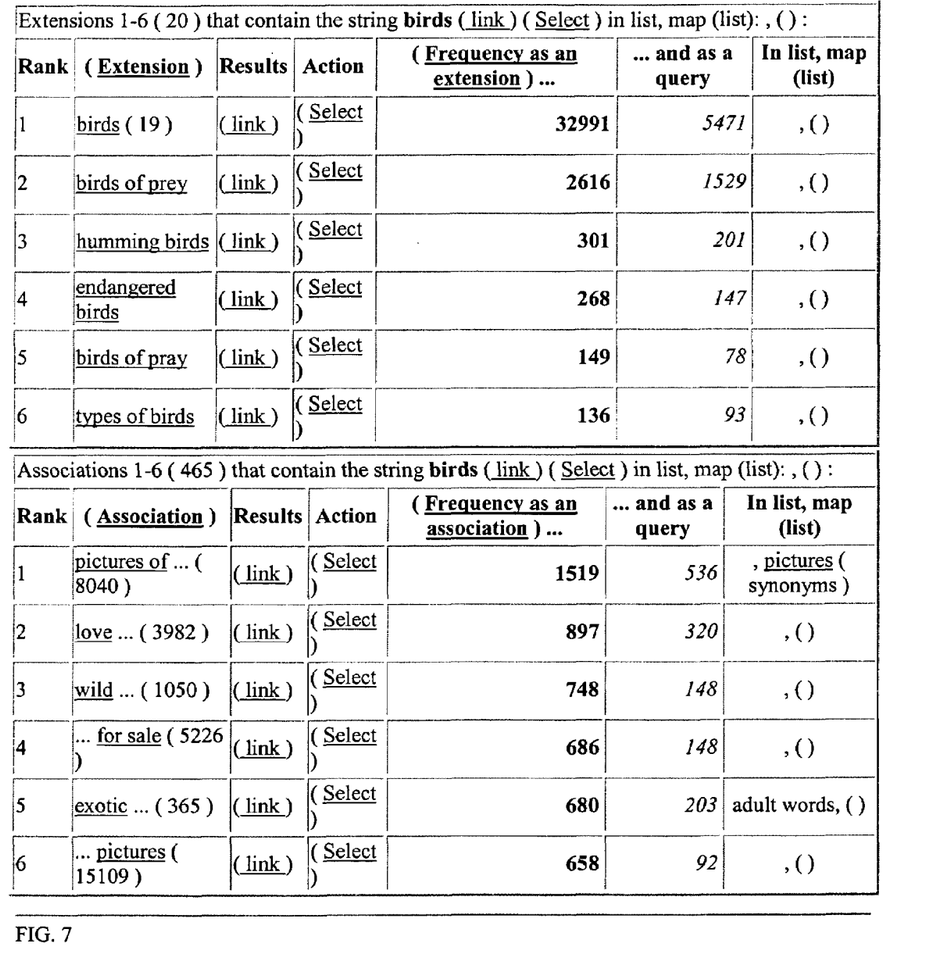

FIG. 7 shows a display page provided in response to an input query "birds". In general, an input query can be a word or words. For extensions lookups, the wildcard character "*" is also supported, both before and/or after the word(s) of the input query. FIG. 8 shows a different display page including a query input GUI form for allowing a user to enter a query, select a random query and adjust parameters associated with the input query according to one aspect. For example, clicking on the R button in the GUI form generates results for a random unit, and clicking on the T button leads to a random traversal through a graph of suggestions. One can choose to view as the results extensions and/or associations. By changing the first line field's value, one can advance as far down the extensions and associations stream as one wishes to go. One can also change the adult filter setting so that one gets to see or not see adult terms. The display portion below the GUI form shows the results for an input query "wood".

As shown in FIGS. 7 and 8, associations refer to relationships between different units based on how often they co-occur in the same query. Extensions, on the other hand, refers to relationships between units where all the words that appear in one unit appear in the second unit in the same sequence. For example, "exotic birds" is an association of "birds" while "birds of prey" is an extension. Only 6 extensions and 6 associations are shown for simplicity, however, it is appreciated that any number may be shown.

The number in parenthesis in the association and extension columns are an estimate of the total number of extensions/associations for the query. By clicking on the appropriate column header, the output can be sorted alphabetically or based on the frequency of the extension/association.

The first two output columns contain the rank and the extension/association with an indication of how many extensions/associations they in turn have in parenthesis. In case of associations, the original query is replaced by an ellipsis ("...") as shown. Also, the result of clicking the extension is that extensions are looked up, in turn, for that specific extension. Clicking on an association, on the other hand, returns associations for the associated unit. Selecting the "link" link in the Results column of FIG. 7 gives the search result in a separate window. The frequency as an extension/association numbers are based on a complete query log for one week, according to one aspect. Each and every query, (including those queries that may appear only once in a week), are taken into account in this calculation.

Figure 10:
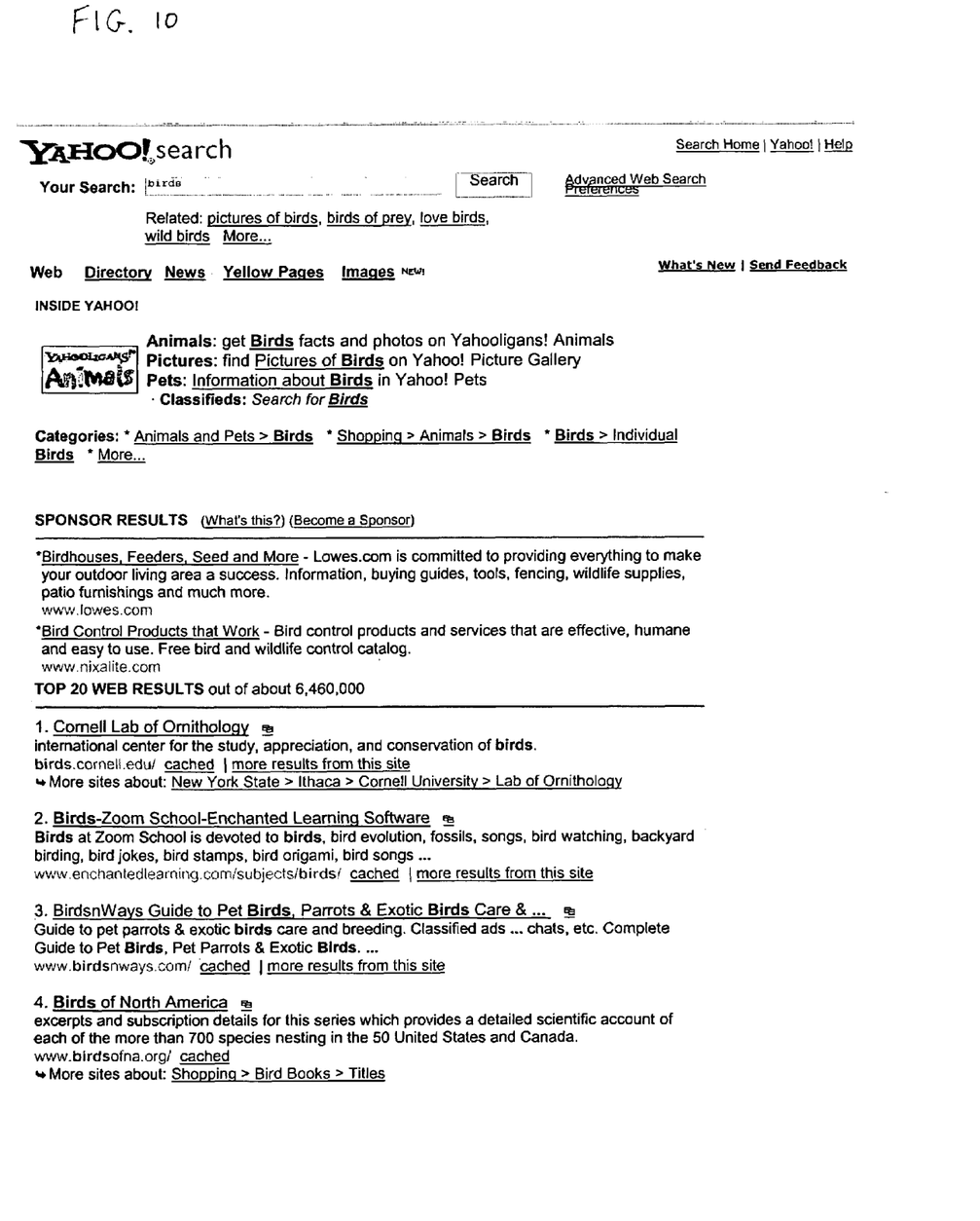

FIGS. 9 and 10 show examples of displays provided to online users responsive to an input search query. In particular, FIGS. 9 and 10 illustrate an example of search results pages that may be returned to a user upon entering the queries "wood" and "birds", respectively. Only a portion of such exemplary display pages are shown for simplicity.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of generating concept units from user search queries, the method comprising:
    receiving a plurality of queries, each query comprising a string of one or more words;
    tokenizing each query string to produce one or more tokens for each query, wherein said tokens for said queries form an initial set of units;
    combining units from the initial set of units that appear adjacent each other in a query to form a second set of units;
    validating the second set of units;
    repeating the steps of combining and validating one or more times using the second set of units in place of the initial set of units until a convergence condition is satisfied, wherein a final set of units is formed once the convergence condition has been satisfied;
    storing the final set of units to a memory;
    wherein the second set of units comprises a plurality of units, and wherein validating the second set of units comprises:
        detecting (a) how often each of the plurality of the units appears by itself separate from others of the plurality of units;
        detecting (b) how often two or more of the plurality of units appear next to each other across an entire set of queries; and
        comparing a result of (a) with a result of (b).

2. The method of claim 1, wherein receiving includes receiving one or more query log files, each query log file including a plurality of queries.

3. The method of claim 2, further comprising consolidating the plurality of queries from the one or more query log files into a single consolidated query file.

4. The method of claim 3, wherein consolidating includes removing duplicates of queries and incrementing a count associated with each individual query each time a duplicate of said individual query is removed, wherein the consolidated file includes a list of individual queries and counts associated therewith.

5. The method of claim 3, wherein the received query log files include query log files for each day of a week, and wherein consolidating includes forming a single consolidated query file including queries for the week.

6. The method of claim 1, further including generating unit extensions using the final set of units.

7. The method of claim 6, wherein generating unit extensions includes identifying units that are subsets of other units.

8. The method of claim 6, further including storing the unit extensions to the memory.

9. The method of claim 1, further including generating unit associations using the final set of units.

10. The method of claim 9, wherein generating unit associations includes identifying units that are associated with other units.

11. The method of claim 10, further including storing the unit associations to the memory.

12. The method of claim 10, wherein identifying associated units includes determining which units appear in queries with other units.

13. The method of claim 1, further comprising generating unit alternatives after the convergence condition has been satisfied.

14. The method of claim 13, wherein generating unit alternatives includes determining whether an edit distance between two units in the final set of units is smaller than a threshold value, and if so, comparing the relative frequencies of the two units.

15. The method of claim 1, further comprising:
    generating unit extensions using the final set of units;
    generating unit associations using the final set of units; and
    generating unit alternatives using the final set of units.

16. The method of claim 15, further including storing the unit extensions, the unit associations and the unit alternatives to the memory.

17. The method of claim 15, wherein generating unit extensions includes identifying units that are subsets of other units, wherein generating unit associations includes identifying units that are associated with other units, and wherein generating unit alternatives includes determining whether an edit distance between two units in the final set of units is smaller than a threshold value, and if so, comparing the relative frequencies of the two units.

18. The method of claim 1, wherein validating includes for each combined unit in the second set of units, comparing a frequency of occurrence of the combined unit with a frequency of occurrence of each constituent unit in the combined unit.

19. The method of claim 1, wherein the convergence condition includes a threshold value, wherein the convergence condition is satisfied if a change in the number of units in the two second set of units between successive steps of combining and validating is smaller than or equal to the threshold value.

20. The method of claim 1, further including:
    receiving an individual query from a user;
    identifying one or more units in the individual query; and
    determining one or more suggestions to provide to the user responsive to the query using one or more of the unit extensions, unit associations and unit alternatives stored in the memory in association with the one or more units identified in the individual query.

21. A system for generating concept units from user search queries, the system comprising:

a memory unit; and a processing module configured to receive one or more query log files, each query log file including a plurality of queries, each query including a string of one or more words, and wherein the processing module is further configured to:

tokenize each query from the query log files to produce an initial set of units; and thereafter, iteratively, until a convergence condition is satisfied;

combine units from the initial set of units that appear adjacent each other in a query to form a second set of units; and validate the second set of units, wherein the second set of units is used for each iteration; and once the convergence condition has been satisfied, store a final set of units to the memory unit;

wherein the second set of units comprises a plurality of units, and wherein validating the second set of units comprises:

detecting (a) how often each of the plurality of the units appears by itself separate from others of the plurality of units;

detecting (b) how often two or more of the plurality of units appear next to each other across an entire set of queries; and comparing a result of (a) with a result of (b).

22. The system of claim 21, further including one or more query log file sources for providing the query log files.

23. The system of claim 21, wherein the processing module is further configured to:

generate unit extensions using the final set of units;
generate unit associations using the final set of units;
generate unit alternatives using the final set of units; and
store the unit extensions, unit associations and unit alternatives to the memory unit in association with the final set of units.

24. The system of claim 21, wherein the received query log files include query log files for each day of a week, and wherein the processing module is further configured to consolidate the query log files into a single consolidated query file consisting of queries for the week.

25. The system of claim 24, wherein the processing module consolidates by removing duplicates of queries and incrementing a count associated with each individual query each time a duplicate of said individual query is removed, wherein the consolidated file includes a list of individual queries and counts associated therewith.

26. The system of claim 25, wherein the processing module determines a frequency of occurrence for each unit using the counts associated with the queries, and wherein the processing modules stores the unit frequencies to the memory unit in association with the final set of units.

27. The system of claim 21, wherein the memory unit and processing module are implemented in a search server device in a network.

28. A computer readable medium including code for causing a processor to generate concept units from a plurality of user search queries, each query comprising a string of one or more words wherein the code includes instructions to:

a) tokenize each query string to produce one or more tokens for each query, wherein said tokens for said queries form an initial set of units;

b) combine units from the initial set of units that appear adjacent each other in a query to form a second set of units;

c) validate the second set of units;

d) repeat b) and c) one or more times using the second set of units in place of the initial set of units until a convergence condition is satisfied, wherein a final set of units is formed once the convergence condition has been satisfied; and store the final set of units to a memory module;

wherein the second set of units comprises a plurality of units, and wherein validating the second set of units comprises:

detecting (e) how often each of the plurality of the units appears by itself separate from others of the plurality of units;

detecting (f) how often two or more of the plurality of units appear next to each other across an entire set of queries; and comparing a result of (e) with a result of (f).

29. The computer-readable medium of claim 28, wherein the code further includes instructions to:

generate unit extensions using the final set of units;
generate unit associations using the final set of units;
generate unit alternatives using the final set of units; and
store the unit extensions, unit associations and unit alternatives to the memory module in association with the final set of units.

30. The computer-readable medium of claim 29, wherein the instructions to generate unit extensions includes instructions to identify units that are subsets of other units, wherein the instructions to generate unit associations includes instructions to identify units that are associated with other units, and wherein the instructions to generate unit alternatives includes instructions to determine whether an edit distance between two units in the final set of units is smaller than a threshold value, and if so, compare the relative frequencies of the two units.

31. The method of claim 1, wherein each word comprises one or a plurality of alphanumeric characters.

32. The method of claim 1, wherein storing the final set of units to a memory comprises storing the final set of units to a unit dictionary.

33. The system of claim 21, wherein the memory unit comprises a unit dictionary, and wherein storing a final set of units to the memory unit comprises storing the final set of units to the unit dictionary.

34. The computer readable medium of claim 28, wherein storing the final set of units to a memory module comprises storing the final set of units to a unit dictionary.

* * * * *